United States Patent [19]
Nellis

[11] 3,809,910
[45] May 7, 1974

[54] MICROFILM FRAME SELECTION CIRCUITRY
[75] Inventor: David C. Nellis, Victor, N.Y.
[73] Assignee: Itek Corporation, Lexington, Mass.
[22] Filed: Sept. 13, 1973
[21] Appl. No.: 396,918

[52] U.S. Cl............ 250/561, 250/210, 250/570, 356/71, 242/75.52, 353/26
[51] Int. Cl............................................. G08c 9/06
[58] Field of Search .......... 250/210, 209, 208, 571, 250/561, 555, 557, 556, 206; 356/71; 242/75.52; 353/26

[56] References Cited
UNITED STATES PATENTS
| | | | |
|---|---|---|---|
| 3,290,987 | 12/1966 | James et al. | 356/71 X |
| 3,299,272 | 1/1967 | Furukawa et al. | 250/561 |
| 3,678,282 | 7/1972 | Johnson et al. | 250/561 |
| 3,708,677 | 1/1973 | Volk et al. | 356/71 X |

Primary Examiner—Walter Stolwein
Attorney, Agent, or Firm—Homer O. Blair; Robert L. Nathans; Gerald H. Glanzman

[57] ABSTRACT

First and second photodetectors positioned within a bridge configuration are optically coupled to a control track of a roll of microfilm having optically readable control indicia positioned therein. A differential amplifier is coupled across the bridge to produce a positive and negative going signal as each frame passes through the viewing gate. When a selected frame approaches the viewing gate, a first unbalanced condition of the bridge actuates a clutch release control circuit to de-energize the film drive motor. Shortly thereafter, the indicia in the control track produces a second unbalanced condition which actuates a brake control device to stop the drive motor, thereby to position the selected frame within the viewing gate station.

5 Claims, 2 Drawing Figures

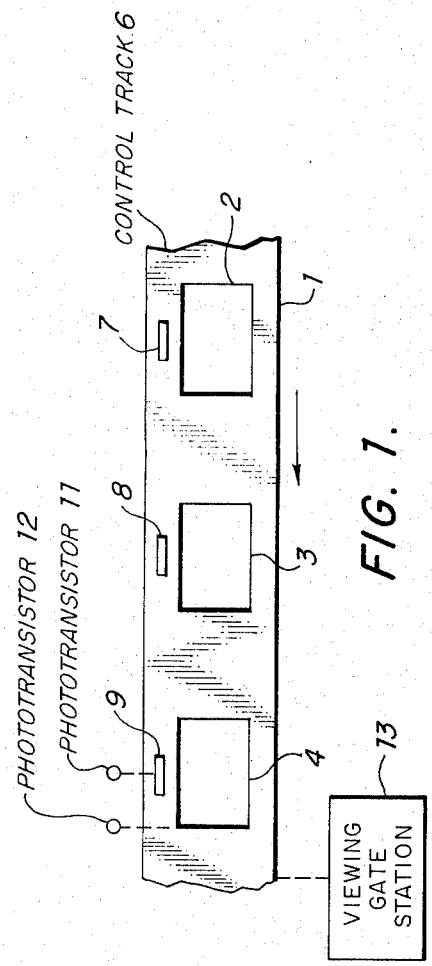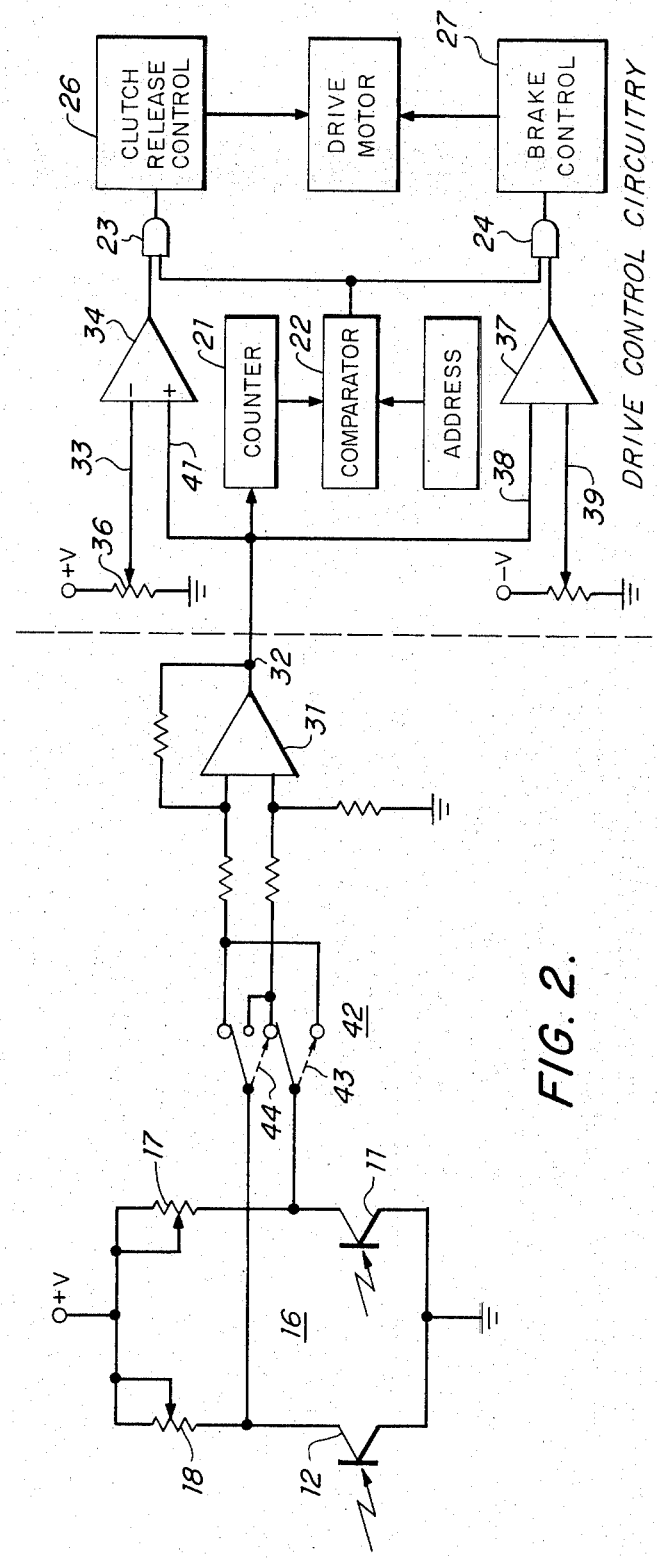

MICROFILM FRAME SELECTION CIRCUITRY

BACKGROUND OF THE INVENTION

This invention relates to the field of microfilm control devices. It is known to position a particular selected frame of a reel of microfilm within a viewing gate station by counting optical indicia or "blips" associated with each frame. Typically, the number of the desired frame is placed in an address register and as the microfilm is driven through the viewing gate as blips are counted. When the accumulated count equals the number in the address register, a comparator produces an output signal which causes the film to stop within the viewing gate station.

It is desirable to produce a system for accurately positioning a selected frame within the viewing gate and for readily accommodating opaque blips or transparent blips as desired. It is also desirable to provide a control system which may be readily employed for handling film having widely varying degrees of light transmissivity in the control track.

SUMMARY OF THE INVENTION

In accordance with a preferred embodiment of the invention, first and second photodetectors forming part of a bridge configuration are optically coupled to a control track having optically read control indicia therein. A differential amplifier is coupled across the bridge configuration to produce a positive and negative pulse for each frame passing through the viewing gate during the time when the driving motor is driving the microfilm therethrough. These pulses drive a counter which is coupled to a digital comparator to produce an enabling condition when the desired frame approaches the viewing gate station. When the optical indicia associated with the selected frame is optically coupled to the first photodetector, a clutch release control circuit decouples the drive motor from the driven microfilm reel; shortly thereafter the indicia is optically coupled to a second photodetector to produce an opposite polarity signal at the output of the differential amplifier, which in turn is employed to brake the take up reel so that the selected frame is properly positioned within the viewing gate station. A polarity reversal switch is employed to readily accommodate opaque control indicia or transparent control indicia as the case may be.

Other objects, features and advantages of the present invention will become apparent upon the perusal of the detailed description taken in conjunction with the drawings in which:

FIG. 1 schematically discloses the relationship between the microfilm and the photodetectors together with the viewing gate station; and FIG. 2 discloses a preferred embodiment of the control system.

DETAILED DESCRIPTION

Microfilm 1 includes a plurality of frames 2, 3 and 4 together with a control track 6 having transparent control indicia or "blips" 7, 8 and 9 positioned therein. Phototransistor 11 and phototransistor 12 are optically coupled to control track 6. The control track is illuminated by means not shown so that light is directed at phototransistor 11 when indicia 9 is in the optical path of phototransistor 11 as shown in FIG. 1. Shortly thereafter, since the microfilm is being driven from right to left, indicia 9 is opposite phototransistor 12 so that light is directed upon phototransistor 12. In FIG. 2, phototransistor 11 is positioned within the first leg of bridge 16 whereas phototransistor 12 is positioned within a second leg of bridge 16 as shown. Resistors 17 and 18, positioned within the third and fourth legs of bridge 16, are adjusted to produce a balanced condition for an average control track density.

Now let it be assumed that frame 4 is the selected frame to be positioned within viewing gate station 13. In accordance with conventional techniques, the count associated with frame 4 will be present within counter 21 to cause an output signal to be produced by digital comparator 22. This condition partially enables AND gates 23 and 24 to set the stage for the actuation of clutch release control circuit 26 and reel brake control circuit 27. When transparent control indicia 9 is positioned as shown in FIG. 1, the impedance of phototransistor 11 will drop to cause differential amplifier 31 to produce a positive signal at its output terminal 32. This positive signal will be more positive than the upper terminal 33 of analog comparator 34, thereby to cause AND gate 23 to actuate clutch release control circuit 26. Adjustable resistor 36 is employed to properly reference analog comparator 34. It should be noted that brake control analog comparator 37 will not produce an output signal because it is configured to only produce an output signal when its upper terminal 38 is more negative than its lower terminal 39. Optical indicia 9 shortly thereafter is optically coupled to phototransistor 12 which produces an opposite unbalanced condition of the bridge, which in turn causes a second output signal to be produced at 32 which is negative going rather than positive going as was previously the case upon the detection of indicia 9 by phototransistor 11. This negative going signal applied to brake control comparator 37 causes an output signal to be applied to AND gate 24 to thereby actuate brake control circuit 27 to cause the take up reel to stop. The negative going signal will not produce an output signal at the output of clutch release comparator 34 because comparator 34 is configured to produce an output signal only where its lower terminal 41 goes more positive than its upper terminal 33.

Now let it be assumed that it is desirable to control a reel of microfilm which employs opaque control indicia against a transparent background in the control track. In this case switch 42 is thrown to assume the position illustrated by the dotted arrows 43 and 44. As a result of this manipulation, the signals produced at the output of differential amplifier 31 are identical to the previously produced signals to properly effect the clutch release and brake control functions discussed hereinabove.

While a preferred embodiment of the invention has been described, the teachings of this invention will readily suggest many other embodiments to those skilled in the art.

I claim:

1. In a system for positioning a predetermined frame of a roll of microfilm within a film gate:
   a. a first photodetection device positioned in a first leg of a bridge;
   b. a second photodetector positioned within a second leg of said bridge;

c. a first impedance device positioned within a third leg of said bridge;

d. a second impedance device positioned within a fourth leg of said bridge;

e. a differential amplifier having a first input terminal coupled between said first and third leg of said bridge and a second input terminal coupled between said second and fourth leg of said bridge;

f. means for optically coupling said first and second photodetector to a control track of said roll of microfilm having optically readable control indicia thereon for causing said photodetectors to produce electrical signals indicative of the passage of said control indicia through said film gate;

g. a film drive motor;

h. clutch release control means coupled to the output of said differential amplifier for de-energizing said drive motor upon the occurrence of a first unbalanced condition of said bridge; and i. brake control means for stopping said drive motor upon the occurrence of a second unbalanced condition of said bridge.

2. The combination as set forth in claim 1 further including a polarity reversal switch coupled between said bridge and the input terminals of said differential amplifier to selectively provide for selective positioning of film having either opaque control indicia or transparent control indicia.

3. The combination as set forth in claim 2 wherein said first impedance device in said third leg and said second impedance device in said fourth leg of said bridge is adjustable.

4. In a system for positioning a predetermined frame of a roll of microfilm within a film gate:

a. a first photodetector;

b. a second photodetector;

c. means for optically coupling said first and second photodetector to a control track of said roll of microfilm having optically readable control indicia thereon for causing said photodetectors to produce electrical signals indicative of the passage of said control indicia through said film gate;

d. a film drive motor;

e. clutch release control means for de-energizing said drive motor;

f. brake control means for stopping said drive motor; and g. control means coupled to said first and second photodetectors for actuating said clutch release control means upon the illumination of said first photodetector but not said second photodetector and for actuating said brake control means upon the illumination of said second photodetector but not said first photodetector.

5. The combination as set forth in claim 4 further including a polarity reversal switch to selectively provide for selective positioning of film having either opaque control indicia or transparent control indicia.

* * * * *